(12) United States Patent
Popović et al.

(10) Patent No.: US 9,053,553 B2
(45) Date of Patent: Jun. 9, 2015

(54) METHODS AND APPARATUS FOR MANIPULATING IMAGES AND OBJECTS WITHIN IMAGES

(75) Inventors: Jovan Popović, Seattle, WA (US); Jen-Chan Chien, Saratoga, CA (US); Chintan Intwala, Santa Clara, CA (US); Sarah A. Kong, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1064 days.

(21) Appl. No.: 12/714,028

(22) Filed: Feb. 26, 2010

(65) Prior Publication Data
US 2013/0120457 A1 May 16, 2013

(51) Int. Cl.
*G06T 15/30* (2011.01)
*G06T 3/00* (2006.01)

(52) U.S. Cl.
CPC .................. *G06T 3/0093* (2013.01)

(58) Field of Classification Search
CPC .............................. G06T 3/0093; G06T 19/20
USPC .................................................. 345/423, 473
See application file for complete search history.

(56) References Cited

U.S. PATENT DOCUMENTS

| 6,768,486 B1 * | 7/2004 | Szabo et al. | 345/420 |
| 2007/0035541 A1 * | 2/2007 | Isner et al. | 345/420 |
| 2009/0002376 A1 * | 1/2009 | Xu et al. | 345/473 |

OTHER PUBLICATIONS

Takeo Igarashi, Tomer Moscovich, John F. Hughes: As-rigid-as-possible shape manipulation, ACM Transactions on Graphics (TOG), vol. 24, Issue 3 (Jul. 2005).

Robert W. Sumner, Jovan Popovic: Deformation transfer for triangle meshes, ACM Transactions on Graphics (TOG), v.23 n. 3, Aug. 2004.
Robert W. Sumner, Matthias Zwicker, Craig Gotsman, Jovan Popovic: Mesh-based inverse kinematics, ACM Transactions on Graphics (TOG), v.24 n. 3, Jul. 2005.
Olga Sorkine, Marc Alexa: As-rigid-as-possible surface modeling, Proceedings of the fifth Eurographics symposium on Geometry processing, Jul. 4-6, 2007.
Marc Alexa, Daniel Cohen-Or, David Levin: As-Rigid-As-Possible Shape Interpolation, SIGGRAPH 2000 Conference Proceedings, 157-164 (2000).
Ullman, S.: Maximizing rigidity: The incremental recovery of 3d structure from rigid and rubbery motion. Technical Report A.I. Memo No. 721, MIT (1983).
A. Cuno, C. Esperanca, A. Oliveira, and P. R. Cavalcanti: 3D as-rigid-as-possible deformations using MLS. Proceedings of the 27th Computer Graphics International Conference, pp. 115-122, Petropolis, RJ, Brazil, May 2007.
Xiaohan Shi, Kun Zhou, Yiying Tong, Mathieu Desbrun, Hujun Bao, Baining Guo, Mesh puppetry: cascading optimization of mesh deformation with inverse kinematics, ACM Transactions on Graphics (TOG), v.26 n. 3, Jul. 2007.

* cited by examiner

*Primary Examiner* — Peter Hoang
(74) *Attorney, Agent, or Firm* — Wolfe-SBMC

(57) ABSTRACT

Methods and apparatus for manipulating digital images. A warping module is described that enables the manipulation of a surface by selectively deforming portions of the surface while maintaining local rigidity. The user may position multiple control points on a surface to constrain deformation. The user may specify multiple properties (e.g., translation, rotation, depth, and scale) at each control point. A mesh may be overlaid on the surface. The warping module may perform an initialization in which the properties are propagated other vertices in the mesh to generate an initial deformed mesh. The warping module may then perform an iterative optimization operation on the deformed mesh to improve the deformation while retaining local rigidity. Thus, instead of moving every pixel in the surface, the warping module moves or adjusts coordinates of the vertices of the mesh. The surface is then deformed according to the deformed mesh.

20 Claims, 12 Drawing Sheets

METHODS AND APPARATUS FOR MANIPULATING IMAGES AND OBJECTS WITHIN IMAGES

BACKGROUND

Description of the Related Art

In digital image processing applications, there may be cases where a user desires to manipulate (e.g., move, rotate, stretch, or bend) portions of images, objects within images, or portions of objects within images. A general term for these operations is shape or object deformation. A conventional approach to object deformation is to define a skeleton for the object; the skeleton can then be manipulated to deform the object. However, properly defining a skeleton for an object may be difficult and is not effective for many shapes of objects or for entire images. Another conventional approach to shape deformation is free-form deformation (FFD) in which an object is divided into polygons; each polygon may be deformed by manipulating vertices of the polygon. However, defining FFD polygons is tedious, and the user must manipulate many vertices to obtain a desired deformation for the object.

A method for object deformation have been proposed that do not require the manual definition of skeletons or FFD polygons. In this method, an object is represented by a triangle mesh. The user moves several vertices of the mesh as constrained handles. The system then computes the positions of the remaining free vertices by minimizing the distortion of each triangle. This method employs a two-step closed-form algorithm in which the first step finds an appropriate rotation for each triangle and the second step adjusts its scale.

SUMMARY

Various embodiments of methods and apparatus for manipulating the content of digital images are described. Embodiments may provide a warping module and a user interface to the warping module that enable the manipulation of a digital image or a specified object or region in a digital image by selectively deforming or warping portions of the image or selected object or region while maintaining local rigidity. In other words, embodiments may allow a portion of an image to be moved or adjusted while reducing or minimizing undesirable distortions in the image. Embodiments may be implemented according to a criterion that the surface under deformation should behave rigidly. If the surface behaves rigidly, the original image is not adversely distorted. To help achieve this goal of rigidity, embodiments may allow the user to add control points to an image. The control points may serve both the purposes of providing handles whereby the surface can be manipulated, and of providing pins or anchors to constrain deformation of the surface at certain points. The user may thus position multiple control points on a surface to constrain deformation so that parts of the surface that the user wants to move do move, and parts of the surface that the user does not want to move do not move.

Embodiments of the warping module may move the underlying points in a surface given the positions of the control points. In addition, embodiments may allow the user to specify multiple properties at each control point. In various embodiments, these properties may include, but are not limited to, translation, rotation, depth, and scale. The depth property, for example, may be used to specify parts of the surface that should be in front of (occlude) other parts of the surface, or to specify parts of the surface that should be behind (be occluded by) other parts of the surface.

Embodiments of the warping module may overlay a coarser grid or mesh on top of the pixels of the surface to be deformed. For example, in some embodiments, a triangle mesh may be used. The warping module takes the control point locations and the information (properties) of the control points. By moving a control point or control points, for example with a mouse or other cursor control device or via user interaction with a touchpad or multitouch device, the user may specify a new position for the control point(s). The user may also specify a rotation around a control point, or one or more other parameters such as a depth of a control point. These properties are stored or associated with each control point. The user can modify those properties (e.g., position, rotation, depth, and scale) via a user interface. Once given the information, the warping module may perform an initialization in which the warping module propagates the information to some or all of the other vertices in the mesh to generate an initial deformed mesh. The warping module may then perform an iterative optimization operation on the deformed mesh to improve the deformation while retaining local rigidity.

Thus, instead of moving every pixel in the surface, embodiments move or adjust coordinates of the vertices of the mesh. The surface is then deformed according to the deformed mesh.

A user may specify rotation at the control points. However, if the user does not specify a rotation, the warping module may infer the rotation by solving the optimization as described herein. In cases where the user specifies a rotation, the rotation information may be propagated to some or all of the other vertices in the mesh. For example, the rotation information may be propagated in the initialization step using the coordinates computed by solving a Laplacian problem. For the depth property, the user may specify a depth at one or more control points. The depth may be propagated throughout the mesh in the same way as the rotation is propagated. If two portions of a surface overlap, the depth values may be compared to determine which is in front and which is behind. A scale property may be similarly specified and propagated. A scale property modifies or scales the distance, or length of an edge, between two neighboring vertices. The objective function stays the same, but the constraints are no longer just positions; certain edges would have to be of a certain length because of the scale assigned to the vertices. Thus, using embodiments of the warping module and user interface, a user may specify one, two, three or more properties at each control point. One or more of these properties may then be propagated throughout the mesh.

Some embodiments may provide a method for the user to specify certain areas of a surface to which propagation of one or more of the control point parameters will be restricted or prohibited so that the area receives less deformation or remains completely rigid. For example, some embodiments may provide one or more user interface elements via which a user may paint or otherwise indicate an area of the surface to prevent the area from warping or to restrict warping in the area.

Since embodiments of the warping module employ an iterative optimization process, some embodiments may allow the user to specify an amount of rigidity or elasticity that the user desires. At a low end, initialization may be performed to produce a deformed mesh, and the surface is then deformed according to the results of the initialization. At the high end, the optimization may be allowed to run until, for example a convergence criterion or criteria is reached and the surface is then deformed according to the results of the optimization to provide local rigidity. Some embodiments may provide one or more modes or levels in between the two extremes that set a certain number of iterations of the optimization function.

Figure 1:
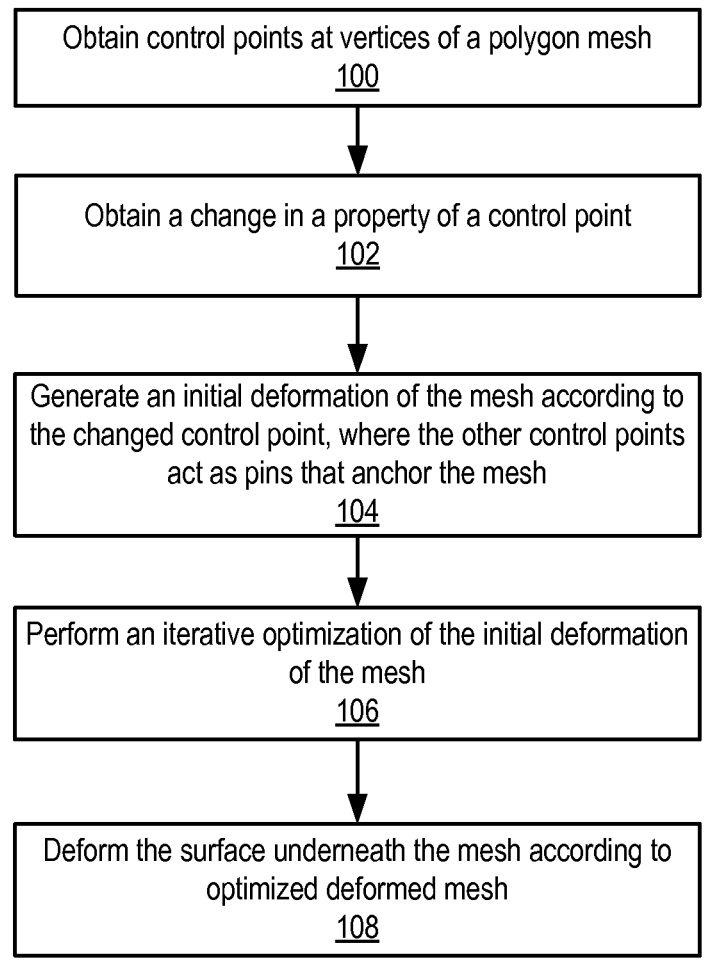
FIG. 1 is a high-level flowchart of a method of operation of a warping module according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for manipulating the content of digital images are described. Embodiments may provide a warping module and a user interface to the warping module that enable the manipulation of a digital image or a specified object or region in a digital image by selectively deforming or warping portions of the image or selected object or region while maintaining local rigidity. In other words, embodiments may allow a portion of an image to be moved or adjusted while reducing or minimizing undesirable distortions in the image.

Embodiments may be implemented according to a criterion that the surface under deformation should behave rigidly. If the surface behaves rigidly, the original image is not adversely distorted. To help achieve this goal of rigidity, embodiments may allow the user to add control points to an image. The control points may serve both the purposes of providing handles whereby the surface can be manipulated, and providing pins or anchors to constrain deformation of the surface at certain points. The user may thus position multiple control points on a surface to constrain deformation so that parts of the surface that the user wants to move do move, and parts of the surface that the user does not want to move do not move.

Embodiments of the warping module may move the underlying points in a surface given the positions of the control points. In addition, embodiments may allow the user to specify multiple properties at each control point. In various embodiments, these properties may include, but are not limited to, translation, rotation, depth, and scale. The depth property, for example, may be used to specify parts of the surface that should be in front of (occlude) other parts of the surface, or to specify parts of the surface that should be behind (be occluded by) other parts of the surface.

Embodiments of the warping module may overlay a coarser grid or mesh on top of the pixels of the surface to be deformed. For example, in some embodiments, a triangle mesh may be used. The warping module takes the control point locations and the information (properties) of the control points. By moving a control point, for example with a mouse or other cursor control device or via user interaction with a touchpad or multitouch device, the user may specify a new position for the control point. The user may also specify a rotation around the control point, or one or more other parameters such as a depth of the control point. These properties are stored or associated with each control point. The user can modify those properties (e.g., position, rotation, and depth) via a user interface. Once given the information, the warping module may perform an initialization in which the warping module propagates the information to some or all of the other vertices in the mesh to generate an initial deformed mesh. The warping module may then perform an iterative optimization operation on the deformed mesh to improve the deformation while retaining local rigidity.

Thus, instead of moving every pixel in the surface, embodiments move or adjust coordinates of the vertices of the mesh. The surface is then deformed according to the deformed mesh.

The initialization and optimization steps of the warping module are described in more detail later in this document. However, in short, initialization takes a property, e.g. rotation, at each control point, and propagates that property to some or all other vertices in the mesh. In other words, initialization determines the rotation of some or all vertices in the mesh given the rotation of the control point(s). In some embodiments, this may be performed by solving a Laplace's equation, which can be solved as a linear system. The linear system, solved, assigns a set of coordinates to each vertex in the mesh. These coordinates may be used to propagate the information of the control point(s). In other words, each vertex in the mesh has some coordinates, some weighting coefficients, that inform the vertex how to weigh the properties at each of the control points in order to compute the property value(s) at the vertex.

Once the properties are propagated, that is once initialization is performed, embodiments may solve an optimization problem that tries to improve the initialization. The propagation generates an initial deformation of the mesh, but does not necessarily minimize the distortion of the original image. Thus, the initial deformation of the mesh is used as an initial guess, and an iterative optimization is performed that iteratively improve the local rigidity of the deformation. In some embodiments, optimization may solve the following equation:

$$\arg\min_{f_1,\ldots,f_n,g_1,\ldots,g_n} \sum_{i=1}^{n} \sum_{j \in N(i)} w_{ij} \|(f_i - f_j) - g_i(x_i - x_j)\|$$

subject to $f \in C$

The unknowns in this equation are both the coordinates of each of the points (f), which are needed to specify the deformation, and some other property at each vertex (g), for example rotation. C represents the control points as constraints.

Thus, the optimization process tries to simultaneously solve for the best position of each vertex and, in this case, the best rotation of each vertex in order to minimize the distortion subject to matching the specified locations of the control points. This optimization proceeds iteratively so that it starts off with an initial guess, iterates and improves until satisfied with the results or until some termination criterion (e.g., a specified number of iterations, or a convergence criterion) is met.

A user may specify rotation at the control points. For example, in some embodiments, the user may click an option key to open a rotation widget that allows the user to rotate around a control point and fix a particular rotation for the control point. However, if the user does not specify a rotation, the warping module may infer the rotation by solving the optimization as described herein. In cases where the user specifies a rotation, the rotation information may be propagated to some or all of the other vertices in the mesh. For example, the rotation information may be propagated in the initialization step using the coordinates computed by solving a Laplacian problem, as described herein.

For the depth property, the user may specify a depth at one or more control points. In some embodiment the warping module may use a strategy that assigns a random depth to each control point; the user may override the depth assignment by specifying depth ordering. The depth may be propagated throughout the mesh in the same way as the rotation is propagated. If two portions of a surface overlap, the depth values may be compared to determine which is in front and which is behind. Two triangles in the mesh may have slightly different depths at the vertices; these triangles may be examined, and depth order may be based on a comparison of the depths so that the triangles are rendered appropriately.

A scale property may be similarly specified and propagated. A scale property modifies or scales the distance, or length of an edge, between two neighboring vertices. The objective function stays the same, but the constraints are no longer just positions; certain edges would have to be of a certain length because of the scale assigned to the vertices.

Thus, using embodiments of the warping module and user interface, a user may specify one, two, three or more properties at each control point. One or more of these properties may then be propagated throughout the mesh.

Some embodiments may provide a method for the user to specify certain areas of a surface to which propagation of one or more of the control point parameters will be restricted or prohibited so that the area receives less deformation or remains completely rigid. For example, some embodiments may provide one or more user interface elements via which a user may paint or otherwise indicate an area of the surface to prevent the area from warping or to restrict warping in the area.

Since embodiments of the warping module employ an iterative optimization process, some embodiments may allow the user to specify an amount of rigidity or elasticity that the user desires. At a low end, initialization may be performed to produce a deformed mesh, but the optimization may not be performed, to allow maximum elasticity. The surface is then deformed according to the results of the initialization. At the high end, the optimization may be allowed to run until, for example a convergence criterion or criteria is reached. The surface is then deformed according to the results of the optimization to provide local rigidity. Some embodiments may provide one or more modes in between the two extremes that set a certain number of iterations of the optimization function. Some embodiments may allow any number of iterations to be specified by the user to allow a smooth transition between elasticity and rigidity.

FIG. 1 is a high-level flowchart of a method of operation of a warping module according to some embodiments. As indicated at 100, a plurality of control points, each at a vertices of a polygon mesh overlaid on an image, may be obtained. In some embodiments, two or more properties of one or more of the control points may be specified by the user, or otherwise inferred. As indicated at 102, a change in a property of a control point may be obtained. For example, a user may move one of the control points in the image, and/or may specify a property (e.g., a rotation) at a control point or points. As indicated at 104, an initialization may be performed that generates an initial deformation of the mesh according to the changed control point, where the other control points act as pins that anchor the mesh. The initialization may propagate one or more properties at the control point(s) to other vertices of the mesh. As previously noted, some embodiments may provide a method for the user to specify certain areas of a surface to which propagation of one or more of the control point parameters will be restricted or prohibited. As indicated at 106, an iterative optimization of the initial deformation of the mesh may be performed to improve local rigidity. As indicated at 108, the surface underneath the mesh may then be deformed or adjusted according to optimized deformed mesh.

In some embodiments, additional control points may be added as pins and/or for use in manipulating the image, and one or more other control points may be adjusted or properties of control points may be specified by the user to further manipulate the image. Each adjustment of a control point may result in elements 104 through 108 being performed.

Figure 2:
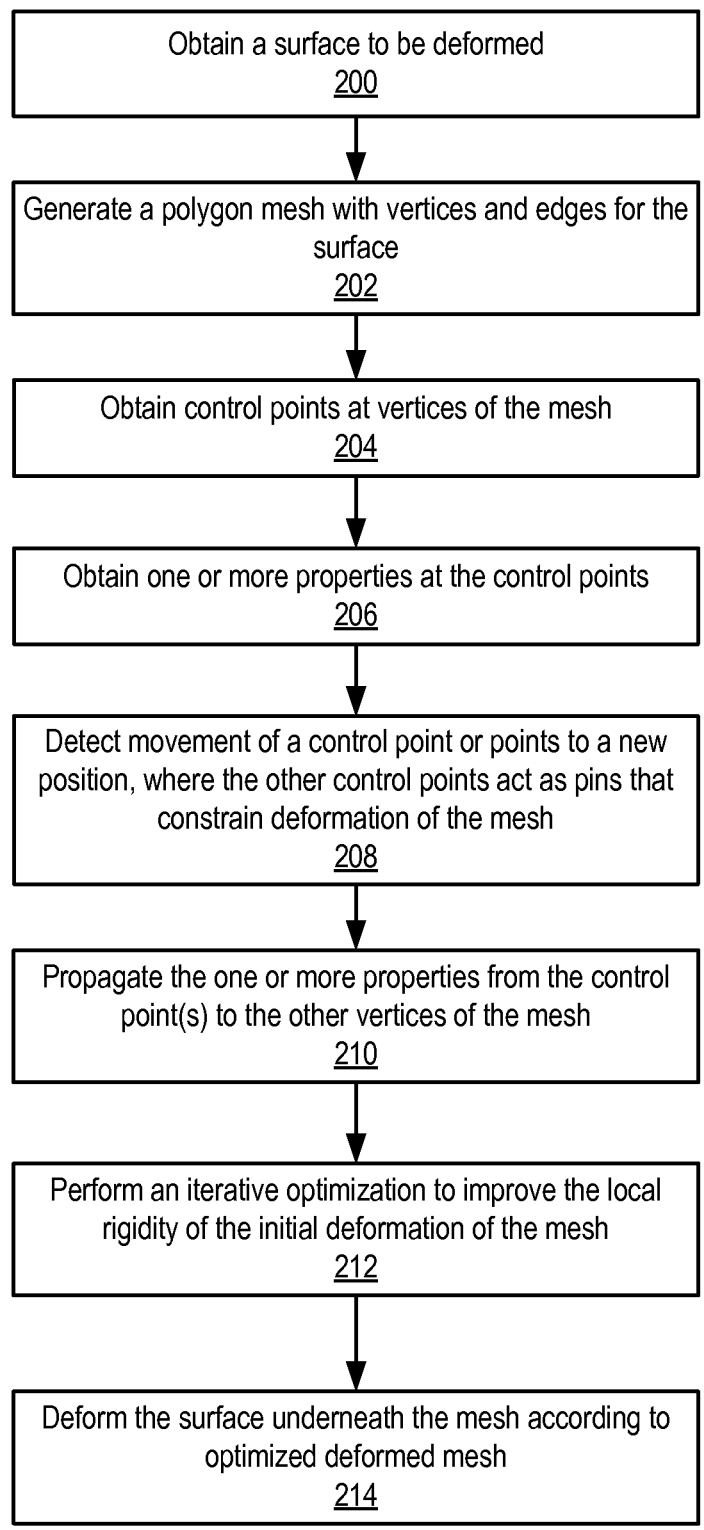
FIG. 2 is a more detailed flowchart of a method of operation of a warping module according to some embodiments.

FIG. 2 is a more detailed flowchart of a method of operation of a warping module according to some embodiments. As indicated at 200, a surface to be deformed may be obtained. In embodiments, the warping module obtains an image or an object or region within an image to be manipulated. For example, a user may specify the image or object/region via the user interface. A specified object or region may, for example, be the figure of a human, an animal, or any other object or region that appears in the image. Manual and automated methods for selecting or specifying objects or regions of images are known in the art; any such method may be used in embodiments to specify an object in an image to be manipulated. For the purposes of this document, what is to be manipulated (e.g., an entire image or an object or region within an image) may be referred to as a surface.

As indicated at 202, after obtaining the surface to be manipulated, the warping module may generate a polygon mesh on the surface. In some embodiments, a triangle mesh may be used; a triangle mesh is used as an example in this document. FIG. 4B shows an example image with a triangle mesh overlaid on the surface. However, other polygon meshes may be used in some embodiments. In the mesh, each polygon is defined by three (or more) vertices and three (or more) corresponding edges that connect the vertices; neighboring polygons may share at least one vertex. Methods for generating such polygon meshes for surfaces are known in the art; any such method may be used in embodiments to generate a polygon mesh for a surface to be manipulated.

As indicated at 204, control points may be obtained at vertices of the mesh. The warping module obtains one or more control points on the surface. FIG. 4C shows an example image with control points on the surface. For example, a user may specify control points on the surface to be manipulated via the user interface to the warping module. Each control point may correspond to a different one of the vertices of the mesh. Generally, the control points are placed for one (or both) of two reasons: to be used to adjust a part of the surface that is to be manipulated, or to constrain or hold a part of the surface in place that should not be moved when another control point is adjusted. While embodiments may accept one or two control points, a single control point results in a simple translation of the entire surface, while two control points result in a simple rotation about one of the two control points. Thus, embodiments are generally directed to the application of image deformation or distortion using three or more control points, where one control point is moved to adjust the surface as desired while the other two or more control points act as pins that constrain the surface adjustment as desired.

As indicated at 206, one or more properties of the control points may be obtained. In various embodiments, these properties may include one or more of, but are not limited to, translation (or position), rotation, depth, and scale. For example, in some embodiments, one or more user interface elements may be provided whereby a user may specify values for translation, rotation, depth, and/or scale properties at each control point. Each of these properties is discussed in more depth throughout this document. While the values for the properties may be specified, for example by a user via the user interface, in some embodiments one or more properties that are not so specified may be inferred or calculated at control points. For example, if the user does not specify a rotation value at a control point, a rotation value may be automatically calculated for the control point by the warping module.

As indicated at 208, one of the control points may be moved. The warping module may, for example, detect movement of a control point or control points to a new position. For example, in some embodiments, a user may use a mouse or other cursor control device, or via user interaction with a touchpad or multitouch device, to move one or more of the control points to a new position on the surface. Movement of a control point from a position A to another position B specifies a translation A→B of the control point. In other words, at least one property (translation) of the control point is changed. Note that the other control points act as pins that constrain deformation of the mesh that results from the detected movement of the control point(s).

At 210, an initialization is performed to generate an initial "guess" at a deformation of the polygon mesh after the adjustment of the control point and one or more of its properties. As indicated at 210, in initialization, one or more properties may be propagated from an adjusted control point, and/or from one or more other control points, to the other vertices of the mesh. In some embodiments, initialization involves propagating a property or properties of the control point(s) to all other vertices of the mesh, subject to the constraints of the other control points and the shape of the surface. In propagating, an interpolation method may be used to adjust values of a property or properties of other vertices according to the values of a property or properties of the control point(s). In some embodiments, the boundary of the surface being manipulated may influence how the property or properties are propagated. See, for example, FIG. 3B, where the human shape represents a surface being manipulated. While control point 300A is closer in Euclidian distance to control point 300C and its nearby vertices than it is to control point 300B and its nearby vertices, the propagation method does not propagate to control point 300C before propagating to control point 300B; propagation instead follows the boundary of the shape and thus propagates down the arm to first reach control point 300B before reaching control points 300D and 300C. As previously noted, some embodiments may provide a method for the user to specify certain areas of a surface to which propagation of one or more of the control point parameters will be restricted or prohibited.

As indicated at 212, an iterative optimization may be performed to improve the local rigidity of the initial deformation of the mesh. After generating the initial deformation of the polygon mesh, embodiments of the warping module may perform an iterative optimization operation to generate an improved deformed mesh. In other words, the warping module starts with an initial guess generated by the initialization process and performs an optimization that iterates to improve the local rigidity of the deformation. In some embodiments, the optimization simultaneously solves for the best position of each vertex and the best rotation of each vertex in order to minimize distortion subject to matching the specified locations of the pins (control points). This optimization starts with the initial guess, iterates, and improves until satisfied with the results (e.g., until some termination criterion or criteria such as a convergence criterion or a specified number of iterations have been performed). See equation (4) and the discussion of optimization below for a discrete optimization technique that may be used in some embodiments to perform optimization.

As indicated at 214, after the improved deformed mesh is generated, the surface underlying the mesh may be deformed according to the improved deformed mesh to render an adjusted or "deformed" surface.

The following presents more detail of the various operations and underlying algorithms that may be used in embodiments of warping method(s) such as those described in FIGS. 1 and 2.

Deformation

Some embodiments may compute a vector-valued deformation function $f: \mathcal{D} \to \square^2$ for a given domain $\mathcal{D} \subset \square^2$ of interest. For any point $x \in \mathcal{D}$, the two component functions of the deformation $f=(f^1, f^2)$ determine the position of a warped point $f(x)=(f^1(x), f^2(x))$. In principle, a deformation function could be inferred from its value at many points in the domain, but this can be tedious to specify. Instead, some embodiments may use energy minimization to compute the deformation from just a few user-specified constraints.

Energy

In some embodiments, energy minimization is used to compute a deformation that not only agrees with the user-specified constraints C (i.e., control points) $f \in C$, but that is also more desirable over other candidates:

$$\arg\min_{f} E[f] \text{ subject to } f \in C \tag{1}$$

The energy term measures the overall distortion of the warp by comparing the local distortion around the point against the ideal locally isometric deformation of the same neighborhood. For example some embodiments may use:

$$E[f] = \int_{x \in \mathcal{D}} \|\nabla f^1(x) - g^1(x)\| + \|\nabla f^2(x) - g^2(x)\| \tag{2}$$

where the linear functions $g^1$ and $g^2$ specify the gradients of the ideal isometric deformation. These gradients and the ideal deformation are not known in advance. Instead, some embodiments may minimize the energy to compute both the deformation $f$ and the gradients $g$:

$$\arg\min_{f,g} E[f, g] \text{ subject to } f \in C \tag{3}$$

Optimization

Some embodiments may use a polygon mesh, for example a triangle mesh, to represent the domain $\mathcal{D}$ for the deformation. A triangular mesh partitions the domain by connecting vertices:

$$\mathcal{V} = \{v_1 v_2, \ldots, v_n\}$$

into triangular faces:

$$\mathcal{T} = \{t_1 t_2, \ldots, t_m\}$$

with each triangle identified by a triple of vertex indices:

$$t_i \in \mathcal{V} \times \mathcal{V} \times \mathcal{V}.$$

By associating 2D positions $x_i \in \square^2$ with every vertex $v_i \in \mathcal{V}$, the location of any point in the domain $x \in \mathcal{D}$ may be computed using a barycentric combination of its three triangle vertices. A barycentric combination may be defined as a weighted sum of points where the coefficients of the points sum to one. Similarly, the deformation $f$ and the gradients $g$ may be extended to the interior of any triangle by associating values $f_1, \ldots, f_n$ and $g_1, \ldots, g_n$ with the corresponding vertices.

These representations allow embodiments to approximate an optimization and energy functional with a discrete optimization. For example, the following discrete optimization may be used in some embodiments:

$$\arg\min_{f_1,\ldots,f_n,g_1,\ldots,g_n} \sum_{i=1}^{n} \sum_{j \in N(i)} w_{ij} \|(f_i - f_j) - g_i(x_i - x_j)\| \tag{4}$$

subject to $f \in C$ where set $\mathcal{N}(i)$ denotes indices of all vertices $v_j$ connected to $v_i$. In some embodiments, in order to minimize local distortion, the gradients at each vertex may be required to be rotations $g_i \in SO(2)$ expressing that a desired deformation should ideally be a distortion free transformation of the local neighborhood. In various embodiments, the above formulation may be solved efficiently with a variety of optimization methods, but since the optimization may have several local minima it may require careful initialization.

Initialization

Some embodiments may initialize the iterative optimization process by propagating inferred gradients near the few user-specified constraints (i.e., control points) to all the remaining mesh vertices. These rotations may be smoothly propagated by computing generalized barycentric coordinates. Barycentric coordinates may be defined as the coefficients in a barycentric combination.

Suppose, for example, that a user specifies desired gradients (rotations) for some subset of mesh vertices $\{g_j : j \in \mathcal{B} \subset \mathcal{V}\}$. Given the generalized barycentric coordinates $a_{ij}$, gradients for the remaining vertices are a weighted combination of user-specified rotations:

$$g_i = \sum_{j \in \mathcal{B}} a_{ij} g_j, \ i \in v \tag{5}$$

In case of rotations, better results may be obtained by interpolating the angles $\theta_j$ that correspond to each rotation $$\theta_i = \sum_{j \in \mathcal{B}} a_{ij} \theta_j, \ i \in v \tag{6}$$

In some embodiments, even if the user does not specify any rotations, the same approach can be used to initialize gradients by first estimating gradients near user-specified constraints and then propagating them to the remaining vertices.

In some embodiments, the interpolation coordinates may be computed by solving one Laplace's equation for every vertex with a specified rotation:

$$\Delta a_j(x) = 0, j \in \mathcal{B} \tag{7}$$

In some embodiments, specific boundary conditions such as $a_j(x_j)=1$ and $\{a_j(x_k)=0 : k \in B \setminus j\}$ may be used to ensure that the above weighted combinations interpolates desired quantities.

Propagation

In some embodiments, the same interpolation may also be used to propagate other user-specified information. For example, a user may assign rendering depths for some subset of vertices $\{d_j : j \in \mathcal{B} \subset \mathcal{V}\}$ and these could then be propagated elsewhere:

$$d_i = \sum_{j \in \mathcal{B}} a_{ij} d_j, \ i \in v \tag{8}$$

In doing so, the user may identify rendering order without having to specify depth for every single vertex. As another example, the user may specify a scaling factor to indicate how much to deviate from the built-in distortion-free energy metric. In that case, scaling factors from one set of vertices may be propagated to all the others.

EXAMPLES

FIGS. 3A through 3H and FIGS. 4A through 4H illustrate examples of manipulating surfaces according to the warping methods described above implemented in an example warping module with an example user interface, according to some embodiments.

Figure 3A:
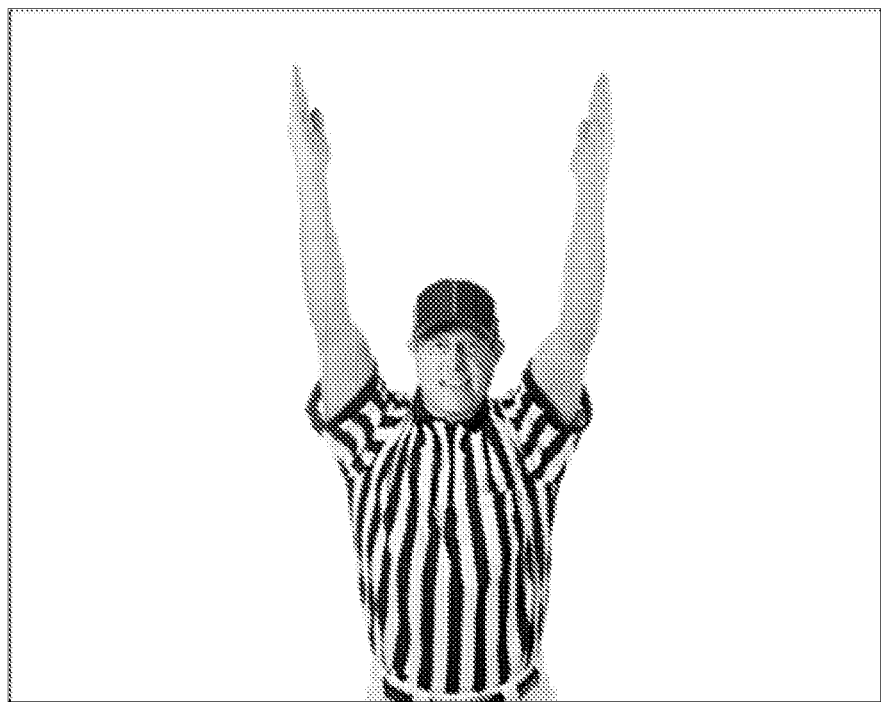
FIGS. 3A through 3H illustrate examples of manipulating a selected object within an image according to the warping methods described above implemented in an example warping module with an example user interface, according to some embodiments.

FIGS. 3A through 3H illustrate examples of manipulating a selected object within an image according to the warping methods described above implemented in an example warping module with an example user interface, according to some embodiments. FIG. 3A shows an example figure of a man (a referee). Manual and automated methods for selecting or specifying objects or regions of images are known in the art; any such method may be used in embodiments to specify an object in an image to be manipulated. For the purposes of this discussion, the selected object (the referee) may be referred to as a surface.

Figure 3B:
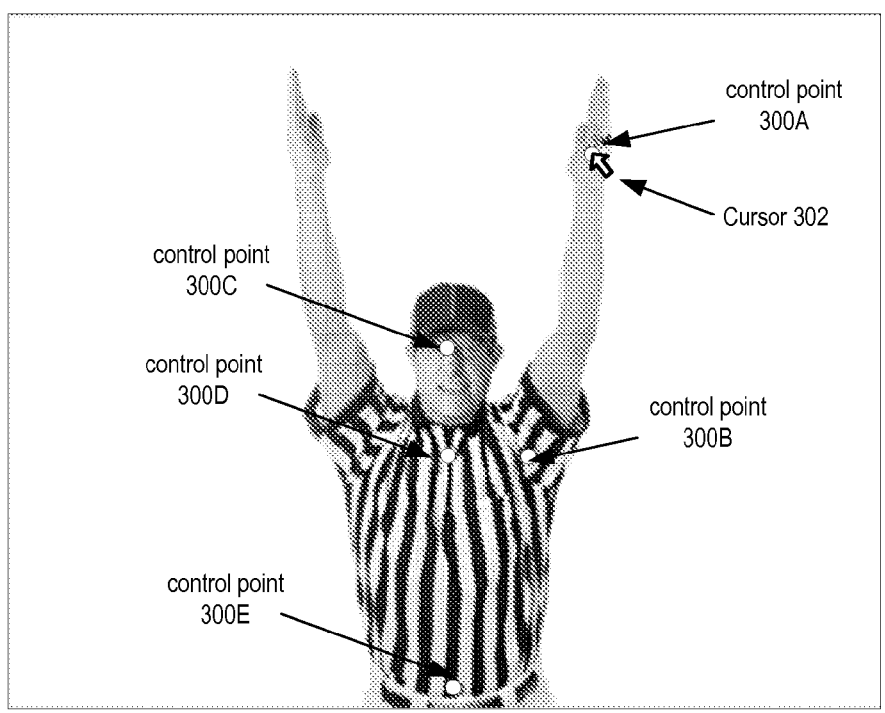

In FIG. 3B, several control points 300A through 300E have been obtained, for example by user selection using a user interface to the warping module. In some embodiments, for example, a control point selection mode may be entered via the user interface, and the user may select the control points using cursor 302. In FIG. 3B, cursor 302 is shown at control point 300A. Note that a polygon mesh (not shown in FIG. 3B) may be or may have been generated for the surface, and each control point may correspond to a vertex of the mesh. In addition to specifying the control points, the user may, via the user interface, specify values for one or more properties of each control point. Example properties include translation, rotation, depth, and scale.

Figure 3C:
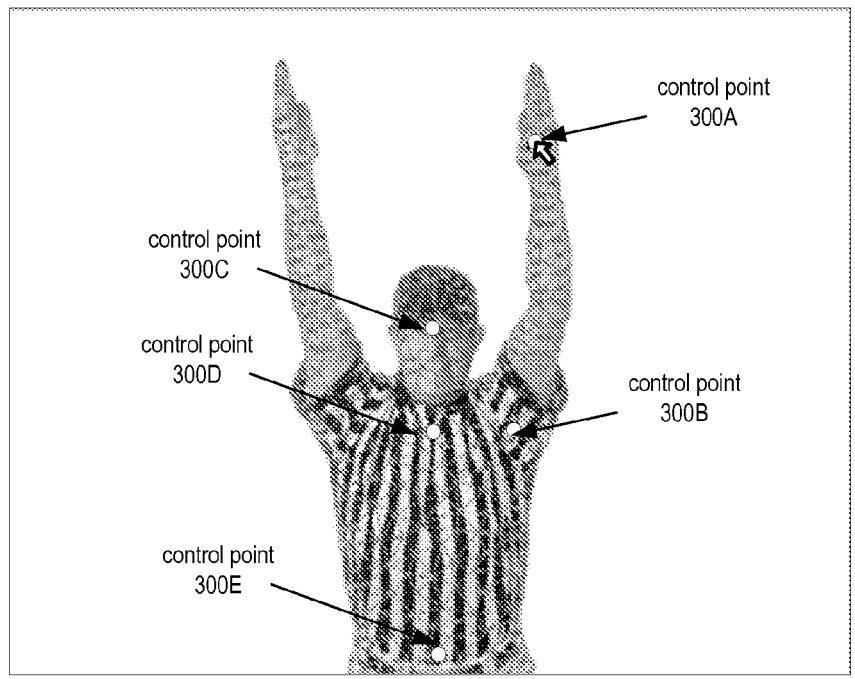

In FIG. 3C, control points 300A through 300E are still present. In addition, an example triangle mesh is shown displayed on the surface. In addition, control point 300A has been moved, for example by the user using a cursor control device (e.g., a mouse, trackball, keyboard keys, etc.) to move the cursor 300 while the cursor is associated with the control point 300A. When the user moves control point 300A, an initialization is performed in which one or more properties of the control point 300A are propagated to other vertices of the mesh to initialize a deformation or warp of the mesh. As previously explained, an interpolation technique may be used to propagate property values to other vertices, and the propagation may be constrained by the shape of the surface and by the other control points 300B through 300D that act as pins or anchors. After the properties of control point 300A are propagated to other vertices of the mesh, an iterative optimization is performed as previously explained to improve the local rigidity of the initial deformation of the mesh. After the optimization, the surface underlying the mesh may be deformed according to the improved deformed mesh to render an adjusted surface. In this instance, the referee's arm is moved slightly inward.

Figure 3D:
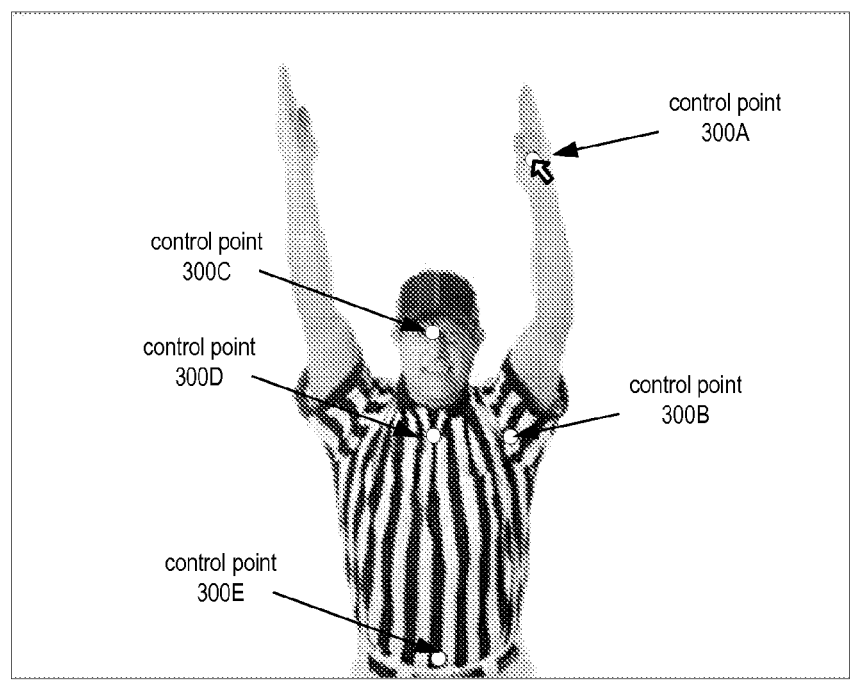

In FIG. 3D, control points 300A through 300E are still present. In addition, control point 300A has again been moved slightly inward by the user. The warping module again performs the warping method as described, resulting in the referee's arm moving a bit more inward.

Figure 3E:
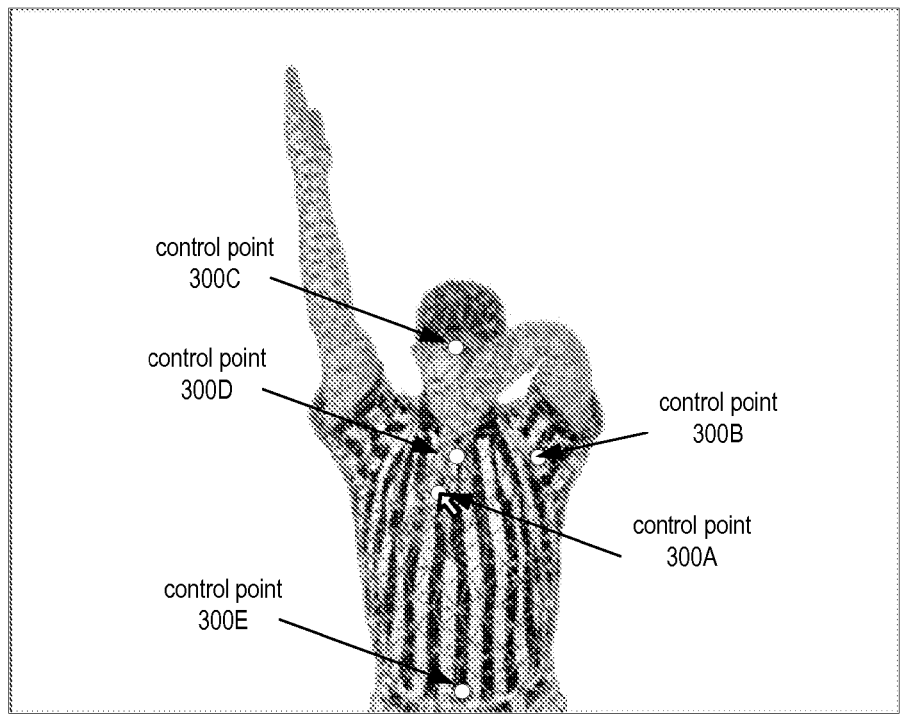

In FIG. 3E, control points 300A through 300E are still present. In addition, an example triangle mesh is shown displayed on the surface. In addition, control point 300A has been moved by the user to over the referee's chest. The warping module again performs the warping method as described, resulting in the referee's arm moving as illustrated. In FIG. 3E, a depth property at control point 300A and/or at other control points 300, either specified by the user or inferred by the warping module, may be used to determine that the left arm should be rendered in front of the head and torso, rather than behind.

Figure 3F:
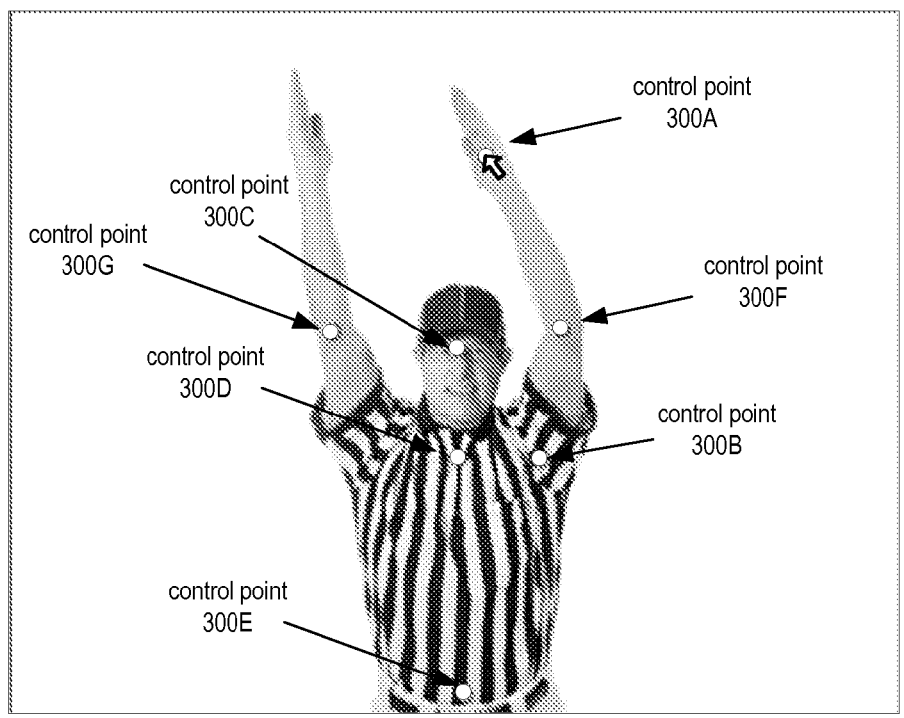

In FIG. 3F, control points 300A through 300E are still present. In addition, the user has added control points 300F and 300G at the referee's elbows. In addition, control point 300A has been moved by the user to over the referee's head. The warping module again performs the warping method as described, resulting in the referee's arm moving as illustrated.

Figure 3G:
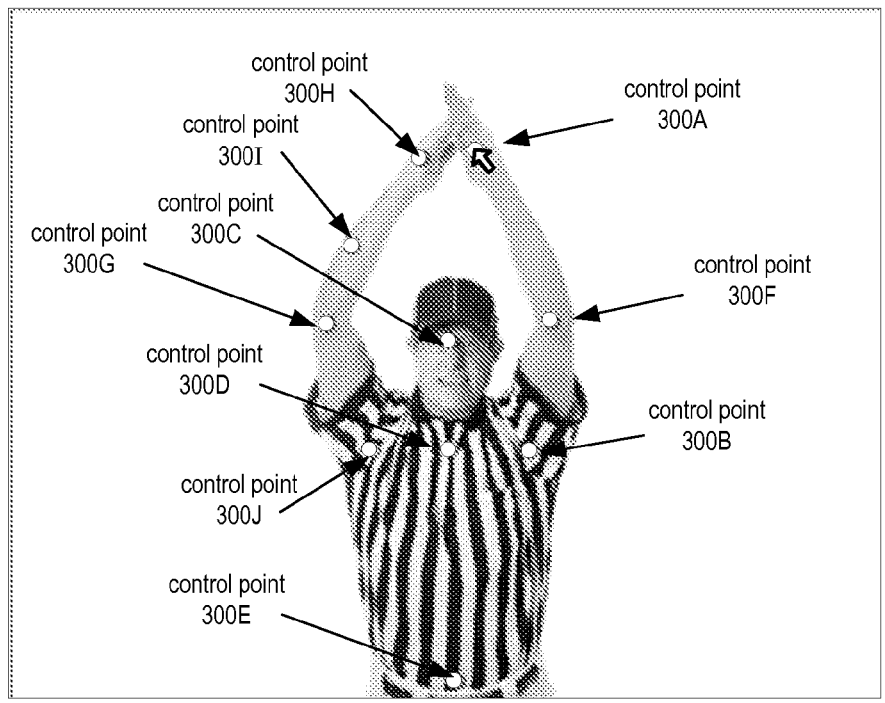

In FIG. 3G, control points 300A through 300G are still present. In addition, the user has added control points 300H, 300I, and 300J. In addition, control points 300H and 300I have been moved by the user to move the referee's right arm inward, and control point 300A has been slightly adjusted as well. The warping module again performs the warping method as described for each moved control point, resulting in the referee's arm moving as illustrated. In FIG. 3G, a depth property at control point 300A and/or at control point 300H, either specified by the user or inferred by the warping module, may be used to determine that the left arm should be rendered in front of the right arm, rather than behind.

Figure 3H:
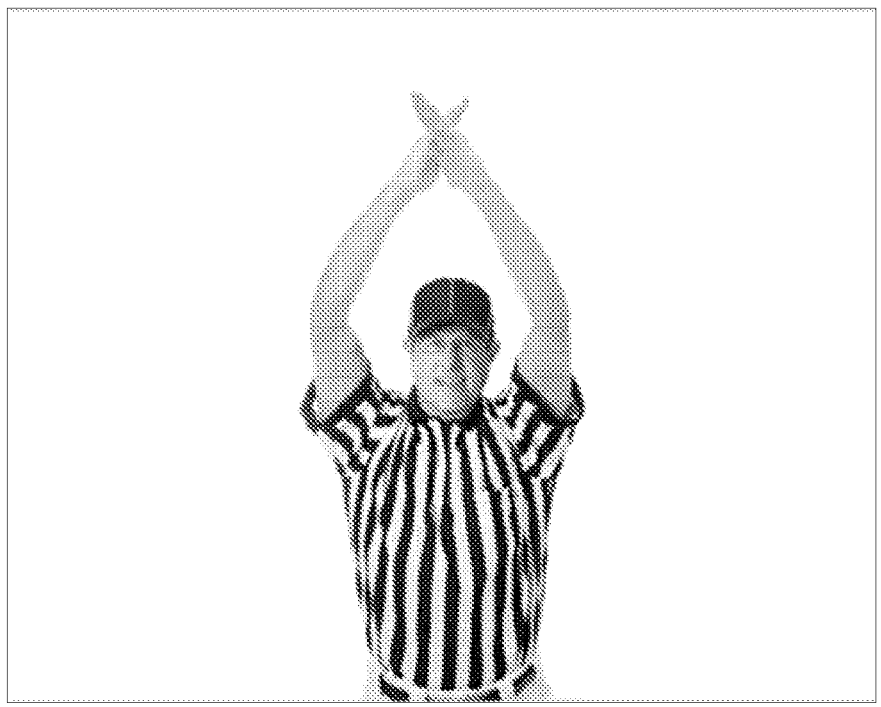

FIG. 3H illustrates a final image of the referee that may be generated after further manipulation of the control points 300. Note that the control points 300 (not shown in FIG. 3H) can be added, removed, and manipulated as described to perform detailed control of the surface. The warping method as described maintains the local rigidity, thus reducing distortion as is commonly seen using conventional warping methods.

Figure 4A:
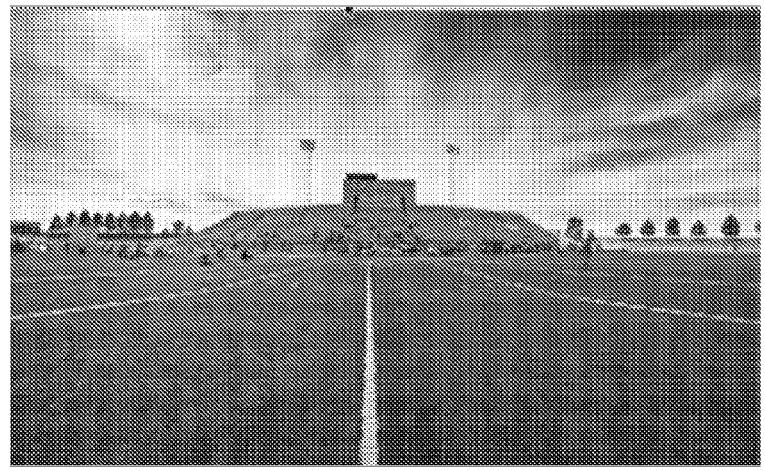
FIGS. 4A through 4H illustrate examples of manipulating an entire image according to the warping methods described above implemented in an example warping module with an example user interface, according to some embodiments.
Figure 4B:
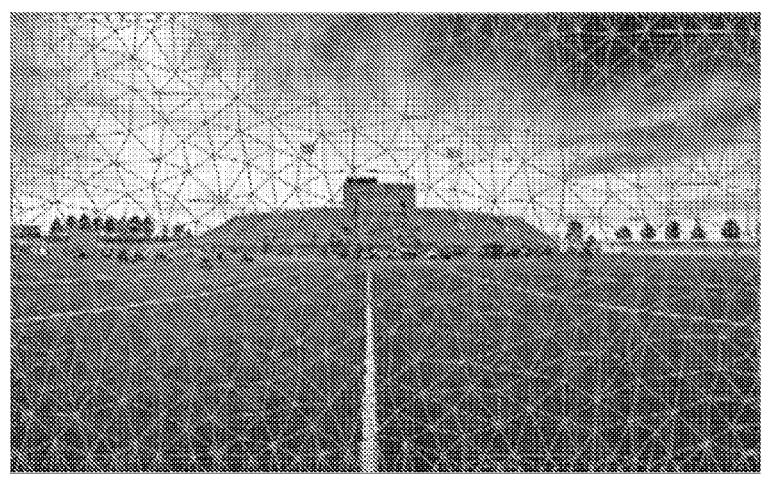
Figure 4C:
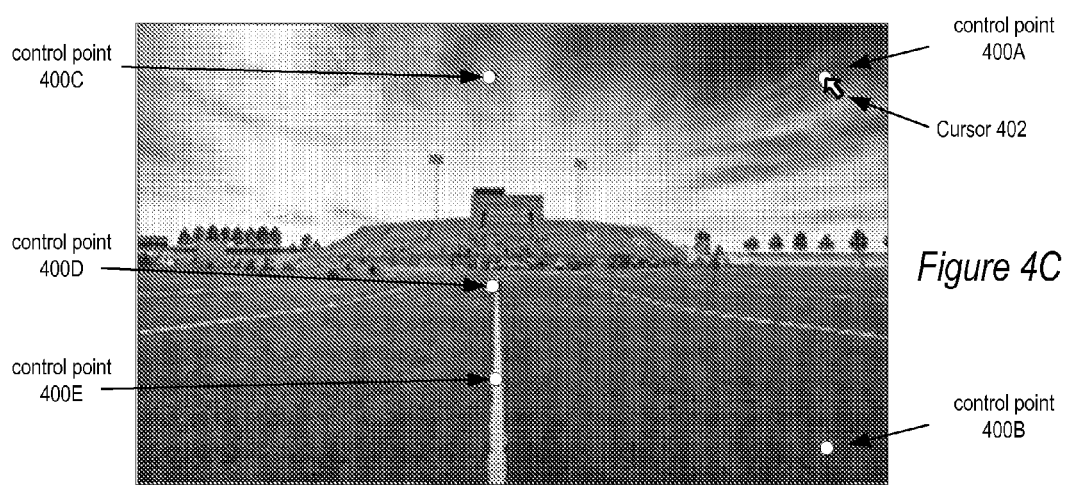

FIGS. 4A through 4H illustrate examples of manipulating an entire image according to the warping methods described above implemented in an example warping module with an example user interface, according to some embodiments. FIG. 4A shows an example image of a football field. The image shows distortion that is common in images captured using wide-angle or fisheye lenses. Embodiments of the warping methods as described herein may be used to reduce or remove this distortion. For the purposes of this discussion, the image may be referred to as a surface. A polygon mesh may be generated for the surface. An example triangle mesh is shown displayed on the surface in FIG. 4B.

In FIG. 4C, several control points 400A through 400E have been obtained, for example by user selection using a user interface to the warping module. In some embodiments, for example, a control point selection mode may be entered via the user interface, and the user may select the control points using cursor 302. In FIG. 4C, cursor 402 is shown at control point 400A. In addition to specifying the control points, the user may, via the user interface, specify values for one or more properties of each control point. Example properties include translation, rotation, depth, and scale.

Figure 4D:
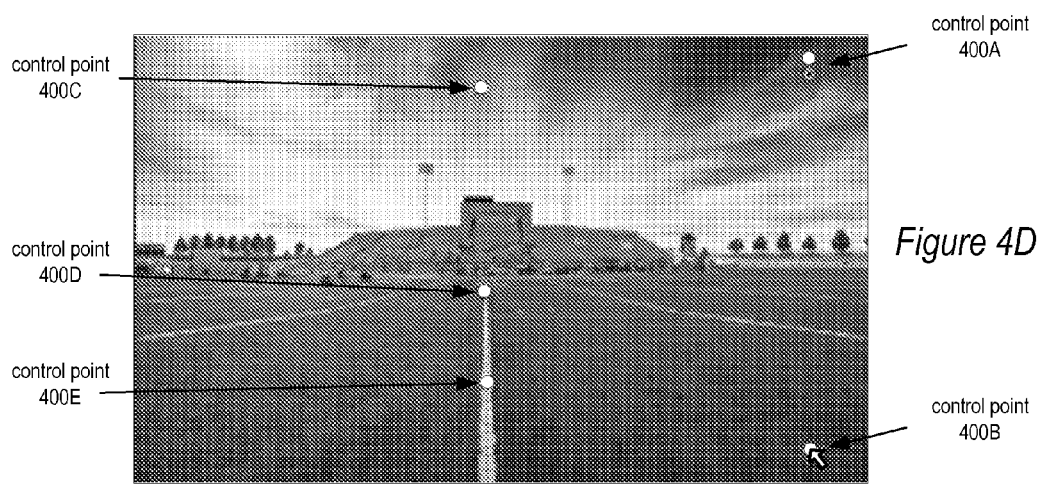

In FIG. 4D, control points 400A through 400E are still present. The cursor 402 is shown at control point 400B. The user may, for example, move control point 400B downward and to the left a bit to slightly straighten the yard lines on the right side of the field. In response, the warping module performs the warping method as described. The other control points 400 pin or anchor the image so that the warping does not effect undesired portions of the image. In other words, the other control points constrain the deformation.

Figure 4E:
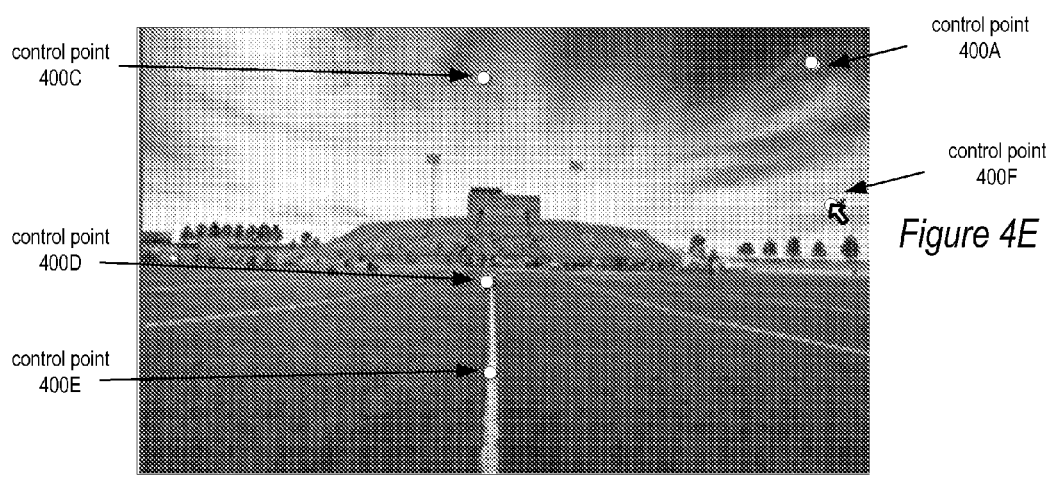

In FIG. 4E, control points 400A and 400C through 400E are still present. Control point 400B has been removed by the user, and a new control point 400F has been added. The user may, for example, move control point 400F up and to the right a bit to slightly straighten the yard lines on the right side of the field. In response, the warping module performs the warping method as described. The other control points 400 again constrain the deformation.

Figure 4F:
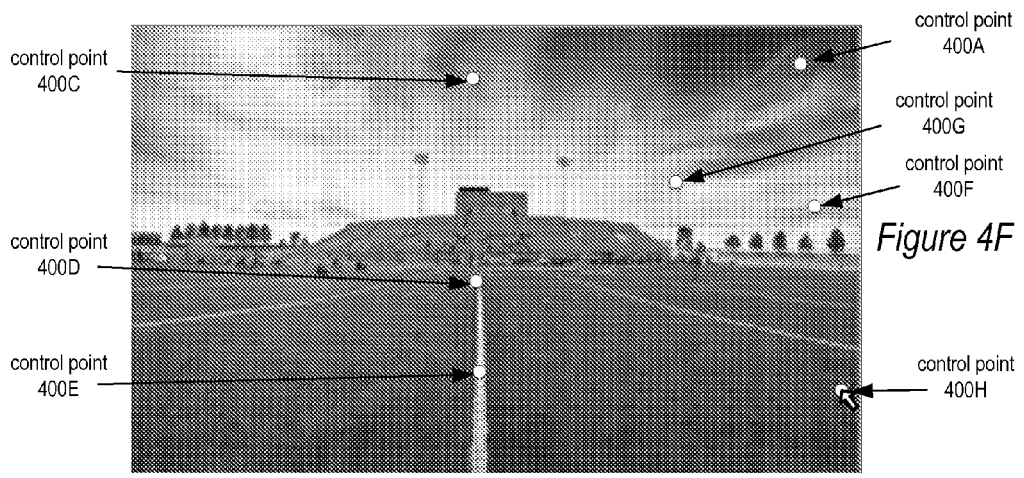

In FIG. 4F, control points 400A and 400C through 400F are still present. In addition, the user has added control points 400G and 400H. The user may move any of the control point 400 to adjust the image to reduce distortion. In response, the warping module performs the warping method as described for each moved control point 400, with the other control points 400 constraining the deformation.

Figure 4G:
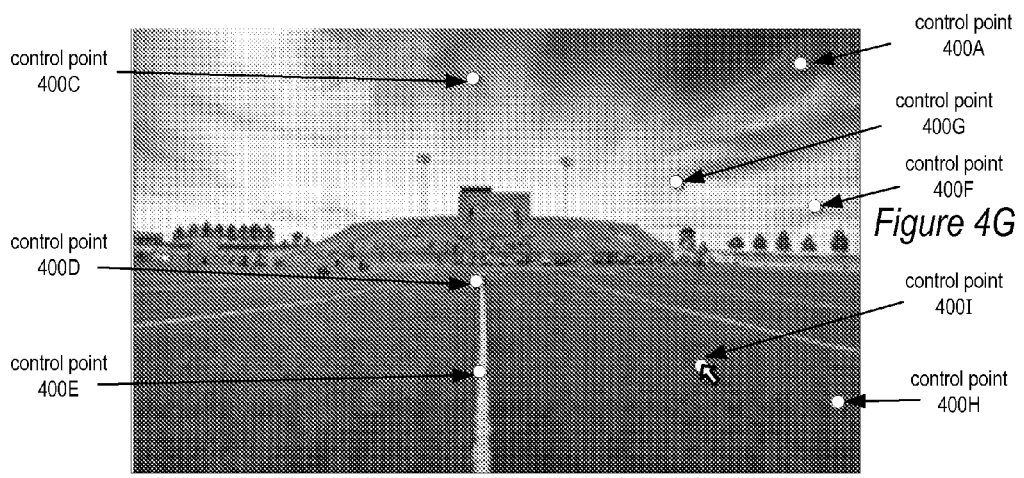

In FIG. 4G, control points 400A and 400C through 400H are still present. In addition, the user has added control point 400I. The user may move any of the control point 400 to adjust the image to further reduce distortion. In response, the warping module performs the warping method as described for each moved control point 400, with the other control points 400 constraining the deformation.

Figure 4H:
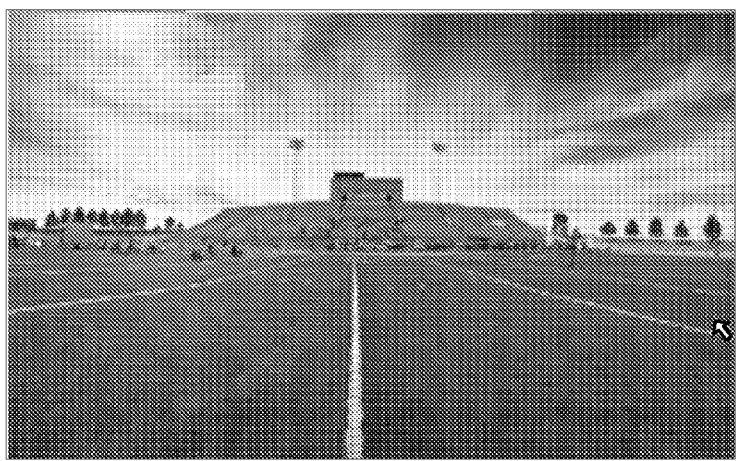

FIG. 4H illustrates a final image that may be generated after manipulation of the control points 400. Note that the control points 400 (not shown in FIG. 4H) can be added, removed, and manipulated as described to perform detailed control of the surface. The warping method as described maintains the local rigidity, thus reducing distortion as is commonly seen using conventional warping methods.

Implementations

Embodiments of a warping module and user interface to the warping module may be implemented as a warping tool. In some embodiments, portions or all of the warping module may be implemented by program instructions configured for execution on a graphics processing unit (GPU), or parallel execution on two or more GPUs. Applications of the warping tool may include, but are not limited to, manipulating or warping digital photographs to, for example, repair camera distortion effects, manipulating or animating parts of selected objects such as human or animal figures within digital images, modeling shapes in synthetically generated two-dimensional (2D) or three-dimensional (3D) images, and in general in any application where digital images or portions of images may need to be warped or deformed. Some embodiments of the warping tool may be implemented, for example, as a module in or plug-in for art design tools such as Adobe® Illustrator® technology and GNU Gimp technology, as a module in or plug-in for other types of image processing applications such as Adobe® Photoshop® technology and Adobe® After Effects® technology, or as a module or plug-in for computer-aided design (CAD) systems. Other embodiments may be otherwise implemented, for example as a stand-alone program or utility, or as a library function. Various embodiments of the warping tool may obtain, manipulate, and output digital images in any of various digital image formats.

Example User Interface

Figure 5:
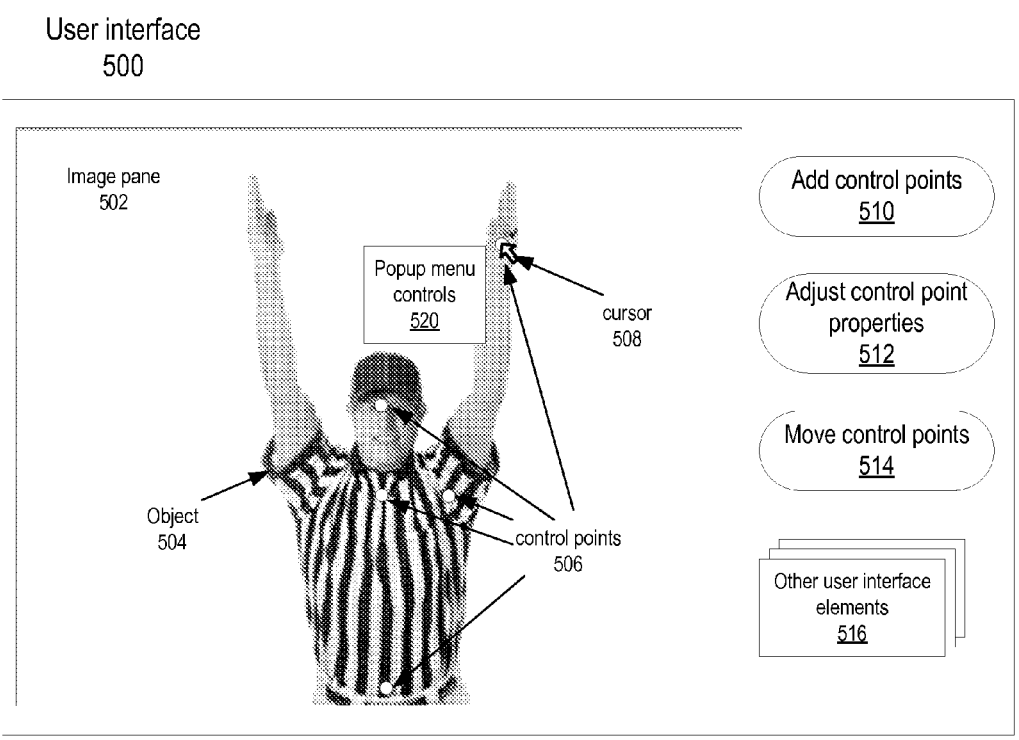
FIG. 5 illustrates an example user interface to a warping module according to some embodiments.

FIG. 5 illustrates an example user interface to a warping module according to some embodiments. User interface 500 is given as an example and is not intended to be limiting. User interface 500 may include an image pane 502 in which a surface (e.g., an entire image or, as shown, a selected object 504 from an image)) may be displayed. User interface 500 may also include one or more textual and/or graphical user interface elements, modes, controls, or techniques via which the user may perform various operations of the warping methods as described herein. For example, user interface 500 may include an add control points 510 user interface element that the user may select to enter an add control points mode in which the user may add control points 506 to the displayed surface, for example by manipulating cursor 508 with a cursor control device (not shown) or by touching a touchpad or multitouch device. As another example, user interface 500 may include an adjust control points properties 512 user interface element that the user may use to specify values for one or more properties (e.g. translation, rotation, depth and scale) of a selected control point. Alternatively, the user interface 500 may provide a method whereby the user may cause popup menu controls 520 to be displayed for a control point 506, via which the user may specify the one or more properties for the control point. Other user interface methods of specifying properties for control points are possible and contemplated. As yet another example, user interface 500 may include a move control points 514 user interface element that the user may select to enter a mode within which the user may move one or more control points 506, for example using a cursor control device, touchpad, or multitouch device. User interface 500 may include one or more other user interface elements 516. As an example, user interface 500 may include one or more user interface elements that may be used to control manual or automatic methods for selecting an object in an image for manipulation, and/or one or more user interface elements whereby the user can paint or otherwise indicate areas of the surface (object 504 in this example) to which propagation of control point parameters will be restricted or prohibited so that deformation of these areas is reduced or prevented. In other words, the user may specify areas of the surface that will remain more or completely rigid.

As mentioned, in some embodiments, multitouch technology may be integrated with the warping tool user interface and warping module. Multitouch is a technology that provides hardware and software that allows computer users to control various applications via the manipulation of multiple digits on the surface of (or, for some devices, proximate to) a multitouch-enabled device. Multitouch technology generally consists of a touch-enabled device (referred to as a multitouch device) such as a touch-sensitive display device (computer display, screen, table, wall, etc.), touchpad, tablet, etc., as well as software that recognizes multiple, substantially simultaneous touch points on the surface of the multitouch device. In contrast, conventional touch-enabled technologies (e.g. a computer touchpad, ATM screen, etc) recognize only one touch point.

Using multitouch technology, a user may simultaneously move two or more control points 506 on the image pane 502. In some embodiments, the warping module may perform the warping method as described herein separately for each of the simultaneously moved control point 506, with the surface deforming accordingly. Alternatively, the warping module may apply the warping method as described herein for two or more control points 506. In other words, the warping module may perform an initialization with propagation based on the information received from two or more moved control points to generate an initial deformed mesh, and then perform optimization as described on the initial deformed mesh.

Example Warping Tool

Figure 6:
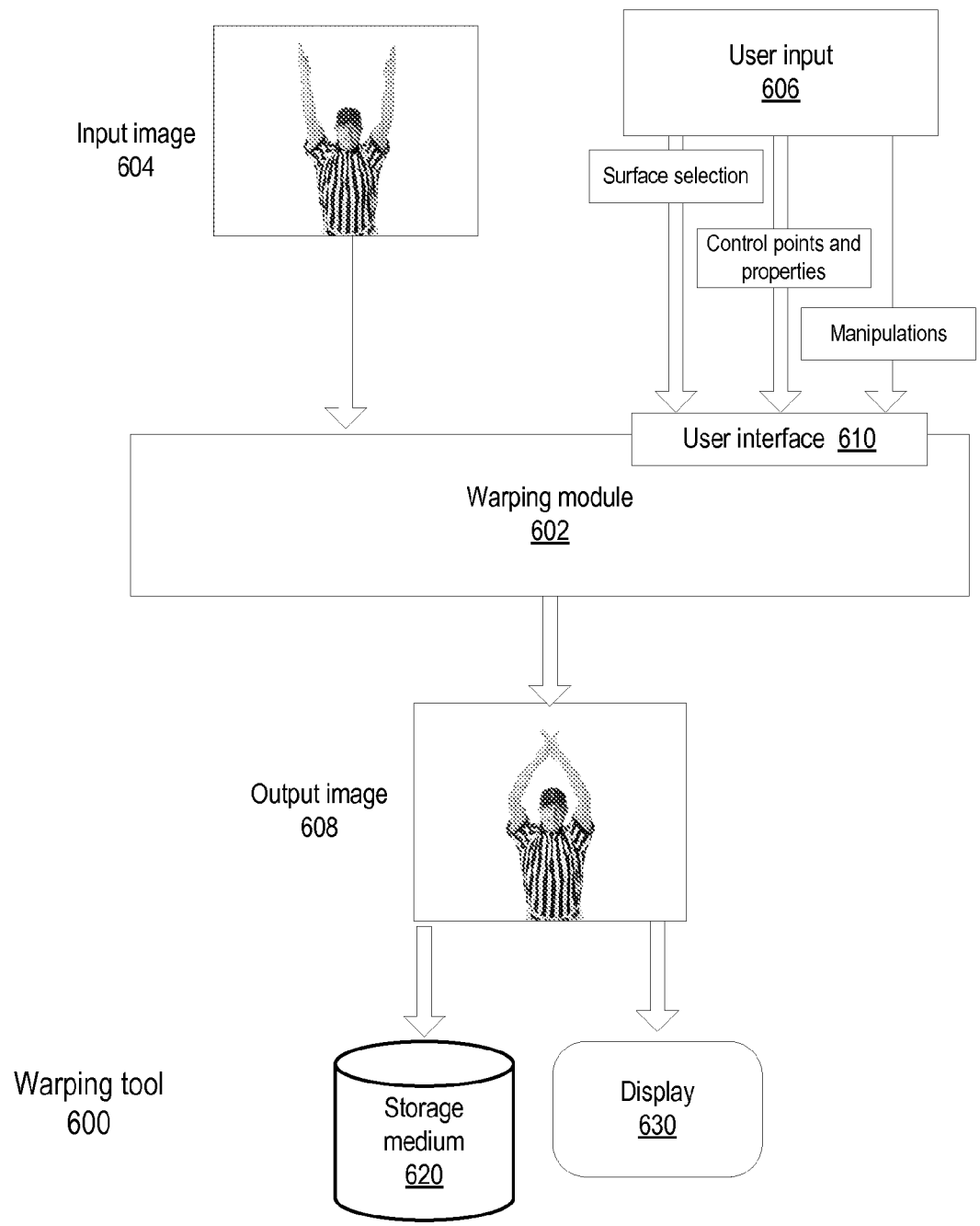
FIG. 6 illustrates an example embodiment of a warping tool.

FIG. 6 illustrates an example embodiment of a warping tool that may implement a warping module as described herein which implements the workflows and methods for manipulating surfaces as described herein. Warping tool 600 may include a warping module 602 that implements an embodiment of a warping method as described herein, for example as described in FIGS. 1 and/or 2, and a user interface 610 to the warping module 602, for example as illustrated in FIG. 5, that provides one or more textual and/or graphical user interface elements, modes or techniques via which a user may provide input to and/or control various aspects of surface manipulation as described herein using embodiments of the warping module 602. Note that a warping tool 600 may implement one or more of these features, may implement subsets of the features or all of the features described herein for embodiments of the warping method. In some embodiments, warping tool 600 may provide real-time or near-real-time feedback to the user via dynamic display on a display device(s) 630 of modifications to an input image 604 made according to the user input received via user interface 610. Thus, the user may perform manipulation of the surface using the warping tool 600, as illustrated by FIGS. 3A-3H and FIGS. 4A-4H, with results being dynamically displayed on a display device 630. Results may be output as an example output image 608. Output image 608 may, for example, be displayed on a display device 630, printed, and/or written to or stored on any of various types of memory media, such as storage media or storage devices 620.

Example System

Figure 7:
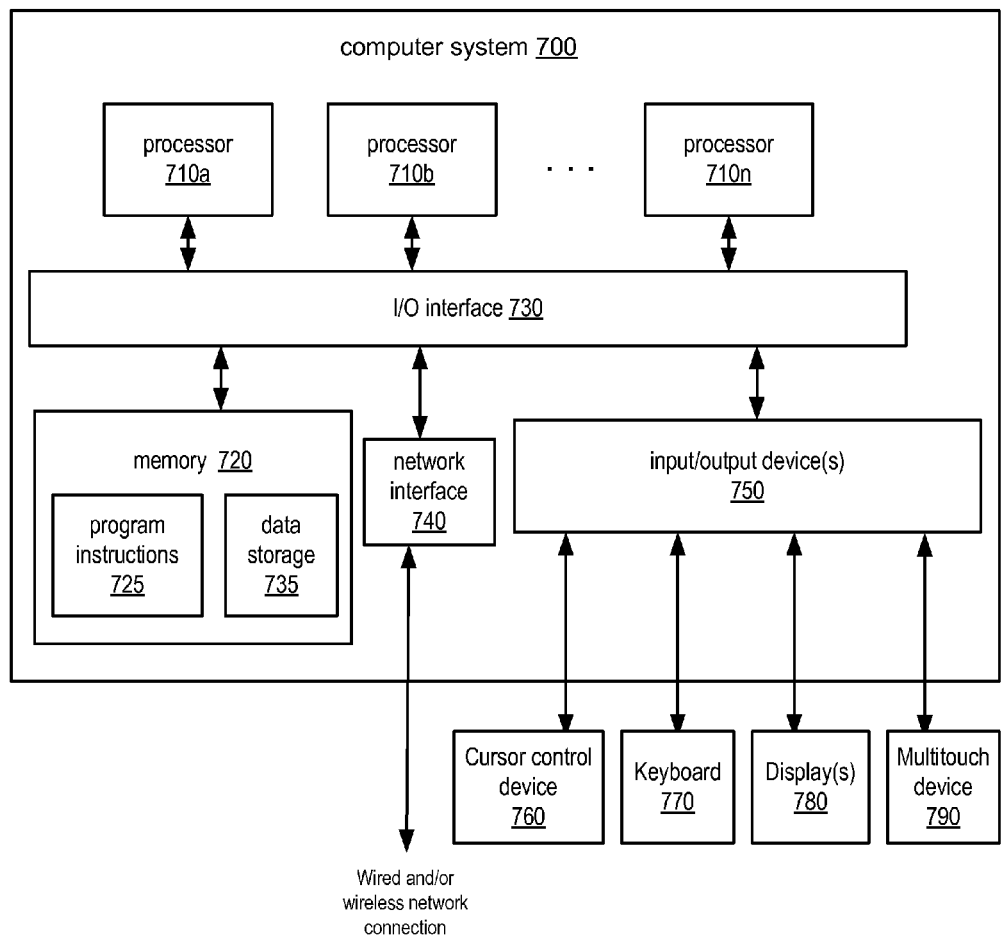
FIG. 7 illustrates an example of a computer system that may be used in embodiments.

Various components of embodiments of the methods for manipulating surfaces, warping module, and/or warping tool as described herein may be executed on one or more computer systems, which may interact with various other devices. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, touchpad (not shown), keyboard 770, display(s) 780, and multitouch-enabled device(s) 790. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for surface inflation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as the methods for manipulating surfaces, warping module, and/or warping tool as described herein, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement embodiments of the methods for manipulating surfaces, warping module, and/or warping tool as described herein, and data storage 735, comprising various data accessible by program instructions 725. In one embodiment, program instructions 725 may include software elements of the methods for manipulating surfaces, warping module, and/or warping tool illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of the methods for manipulating surfaces, warping module, and/or warping tool as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:

receiving user input specifying a plurality of control points for a surface to be deformed, wherein each control point corresponds to a different vertex in a polygon mesh corresponding to the surface, wherein the polygon mesh comprises a plurality of polygons each defined by a set of three or more vertices, wherein neighboring polygons share at least one vertex, and wherein each control point has a set of properties that correspond to properties of a respective vertex;

receiving user input selecting a visual representation of a control point of the plurality of control points, the visual representation being displayed on the surface to be deformed;

responsive to the user input selecting the visual representation of the control point of the plurality of control points, causing a pop-up menu to be displayed in a display region in which the surface is displayed and adjacent to the visual representation of the control point, the pop-up menu configured to receive user input of values for properties of the set of properties for the control point, the properties including a translation property, a rotation property, and a depth property;

receiving user input to the pop-up menu specifying one or more values for one or more of the properties for the control point;

propagating by a computing device the one or more values of the one or more of the properties of the control point to at least a subset of the vertices of the polygon mesh to generate an initial deformed mesh subject to constraint by the plurality of control points, the initial deformed mesh including a current rotation at each of its vertices;

performing an iterative optimization of the initial deformed mesh subject to constraint by the plurality of control points, wherein said iterative optimization of the deformed mesh generates an improved deformed mesh;

deforming the surface according to the improved deformed mesh to render a deformed surface; and displaying the deformed surface.

2. The computer-implemented method as recited in claim 1, wherein said propagating is performed in response to detecting movement of one or more of the control points to a new position relative to the surface.

3. The computer-implemented method as recited in claim 2, wherein said movement of one or more of the control points to a new position relative to the surface is generated by input to a user interface.

4. The computer-implemented method as recited in claim 1, wherein said obtaining a plurality of control points for a surface to be deformed comprises receiving input specifying said plurality of control points.

5. The computer-implemented method as recited in claim 1, wherein the set of properties further include a scale property.

6. The computer-implemented method as recited in claim 1, wherein said propagating comprises interpolating the one or more values across the at least a subset of the vertices subject to constraint by the plurality of control points.

7. The computer-implemented method of claim 1, wherein the initial deformed mesh is generated subject to constraint by user-specified values for one or more of a rotation property or a depth property for one or more other control points of the plurality of control points.

8. The computer-implemented method as recited in claim 1, further comprising causing a user interface to be displayed separately from and concurrently with the pop-up menu, wherein the user interface is configured to receive input to add one or more control points to the surface.

9. The computer-implemented method as recited in claim 8, further comprising causing the user interface to be displayed outside of an image pane in which the surface is displayed.

10. A system, comprising:
at least one processor;
a display device; and
a memory comprising program instructions, wherein the program instructions are executable by the at least one processor to cause the system to perform operations including:
receiving user input specifying a plurality of control points for a surface to be deformed, wherein each control point corresponds to a different vertex in a polygon mesh corresponding to the surface, wherein the polygon mesh comprises a plurality of polygons each defined by a set of three or more vertices, wherein neighboring polygons share at least one vertex, and wherein each control point has a set of properties that correspond to properties of a respective vertex;
receiving user input selecting a visual representation of a control point of the plurality of control points, the visual representation being displayed on the surface to be deformed;
responsive to the user input selecting the visual representation of the control point of the plurality of control points, causing a pop-up menu to be displayed in a display region in which the surface is displayed and adjacent to the visual representation of the control point, the pop-up menu configured to receive user input of values for properties of the set of properties for the control point, the properties including a translation property, a rotation property, and a depth property;
receiving user input to the pop-up menu specifying one or more values for one or more of the properties for the control point;
propagating the one or more values of the one or more of the properties of the control point to at least a subset of the vertices of the polygon mesh to generate an initial deformed mesh subject to constraint by the plurality of control points, the initial deformed mesh including a current rotation at each of its vertices;
performing an iterative optimization of the initial deformed mesh subject to constraint by the plurality of control points, wherein said iterative optimization of the deformed mesh generates an improved deformed mesh;
deforming the surface according to the improved deformed mesh to render a deformed surface; and
displaying the deformed surface to the display device.

11. The system as recited in claim 10, wherein said propagating is performed in response to detecting movement of one or more of the control points to a new position relative to the surface.

12. The system as recited in claim 10, wherein said propagating comprises interpolating the values across the at least a subset of the vertices subject to constraint by the plurality of control points.

13. The system of claim 10, wherein the initial deformed mesh is generated subject to constraint by user-specified values for one or more of a rotation property or a depth property for one or more other control points of the plurality of control points.

14. The system as recited in claim 10, wherein the operations further include causing a user interface to be displayed separately from and concurrently with the pop-up menu, wherein the user interface is configured to receive input to add one or more control points to the surface.

15. The system as recited in claim 14, wherein the operations further include causing the user interface to be displayed outside of an image pane in which the surface is displayed.

16. A computer-readable hardware device storing program instructions that are computer-executable to cause a computer to perform operations comprising:
receiving user input specifying a plurality of control points for a surface to be deformed, wherein each control point corresponds to a different vertex in a polygon mesh corresponding to the surface, wherein the polygon mesh comprises a plurality of polygons each defined by a set of three or more vertices, wherein neighboring polygons share at least one vertex, and wherein each control point has a set of properties that correspond to properties of a respective vertex;
receiving user input selecting a visual representation of a control point of the plurality of control points, the visual representation being displayed on the surface to be deformed;
responsive to the user input selecting the visual representation of the control point of the plurality of control points, causing a pop-up menu to be displayed in a display region in which the surface is displayed and adjacent to the visual representation of the control point, the pop-up menu configured to receive user input of values for properties of the set of properties for the control point, the properties including a translation property, a rotation property, and a depth property;
receiving user input to the pop-up menu specifying one or more values for one or more of the properties for the control point;

propagating by a computing device the one or more values of the one or more of the properties of the control point to at least a subset of the vertices of the polygon mesh to generate an initial deformed mesh subject to constraint by the plurality of control points, the initial deformed mesh including a current rotation at each of its vertices;

performing an iterative optimization of the initial deformed mesh subject to constraint by the plurality of control points, wherein said iterative optimization of the deformed mesh generates an improved deformed mesh;

deforming the surface according to the improved deformed mesh to render a deformed surface; and displaying the deformed surface to a display device.

17. The computer-readable hardware device as recited in claim 16, wherein said propagating is performed in response to detecting movement of one or more of the control points to a new position relative to the surface.

18. The computer-readable hardware device as recited in claim 16, wherein, to propagate values of one or more of the set of properties of the moved control point to at least a subset of the vertices of the polygon mesh to generate an initial deformed mesh, the operations further comprise interpolating the values across the at least a subset of the vertices subject to constraint by the plurality of control points.

19. The computer-readable hardware device of claim 16, wherein the initial deformed mesh is generated subject to constraint by user-specified values for one or more of a rotation property or a depth property for one or more other control points of the plurality of control points.

20. The computer-readable hardware device as recited in claim 16, wherein the operations further comprise causing a user interface to be displayed separately from and concurrently with the pop-up menu, wherein the user interface is configured to receive input to move one or more control points on the surface.

* * * * *